United States Patent [19]
Ohsawa

[11] Patent Number: 5,506,399
[45] Date of Patent: Apr. 9, 1996

[54] FOCUS DETECTION DEVICE

[75] Inventor: Keiji Ohsawa, Tokyo, Japan

[73] Assignee: Nikon Corporation, Tokyo, Japan

[21] Appl. No.: 260,930

[22] Filed: Jun. 15, 1994

[30] Foreign Application Priority Data

Jun. 15, 1993 [JP] Japan ................................ 5-143930

[51] Int. Cl.⁶ ...................................... G01J 1/20
[52] U.S. Cl. .................... 250/201.8; 250/208.1; 250/204; 354/402; 354/404
[58] Field of Search ................ 250/201.8, 204, 250/208.1, 208.2; 354/25, 402, 404

[56] References Cited

U.S. PATENT DOCUMENTS

| | | | |
|---|---|---|---|
| 4,218,623 | 8/1980 | Utagawa | 250/208.2 |
| 4,314,150 | 2/1982 | Takayama et al. | 250/208.1 |
| 4,698,492 | 10/1987 | Ohtaka et al. | 250/204 |
| 5,241,168 | 8/1993 | Sensui | 250/208.1 |

FOREIGN PATENT DOCUMENTS

55-29731  3/1980  Japan.

*Primary Examiner*—Stephone Allen
*Attorney, Agent, or Firm*—Oliff & Berridge

[57] ABSTRACT

A focus detection device is provided that can quickly detect small displacements with high precision in the optical image on arrays of photosensitive elements. The device includes a pair of arrays of photosensitive elements made of rectangular photosensitive elements arranged in a single line and positioned so that the boundary lines D between adjacent photosensitive elements are orthogonal to the direction in which the photosensitive elements are aligned. The boundary lines D are also inclined at a preset angle from the direction corresponding to vertical or horizontal lines in the image field. When the arrays of photosensitive elements and components peripheral to these arrays are solidly attached to a rectangular substrate, the arrays of photosensitive elements are positioned so that the direction in which the photosensitive elements are aligned is parallel to the sides of the perimeter of the substrate. Furthermore, the substrate is positioned so that the sides are inclined at a preset angle from the direction corresponding to vertical or horizontal lines in the image field.

29 Claims, 5 Drawing Sheets

FOCUS DETECTION DEVICE

BACKGROUND OF THE INVENTION

1. Field of the Invention

The present invention relates to a focus detection device used in single lens reflex cameras. More particularly, this invention relates to the positioning of a linear array of photosensitive elements used to detect the focus state of a lens.

2. Description of Related Art

Figure 5:
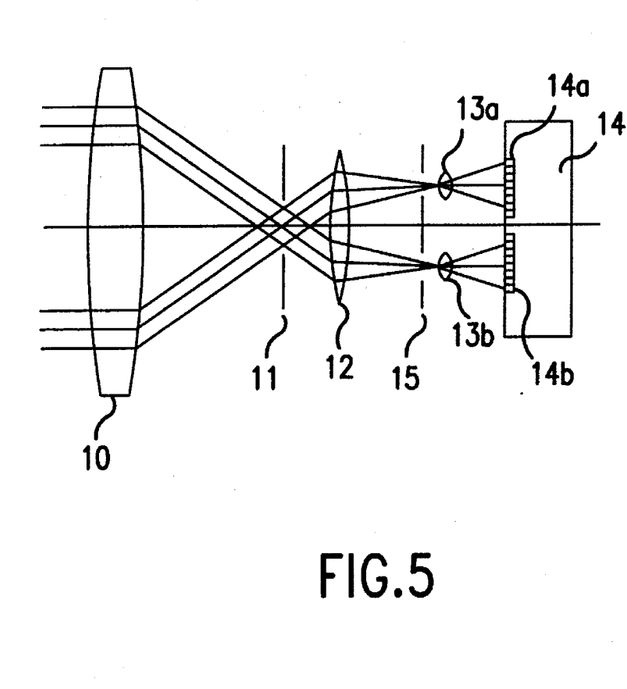
FIG. 5 is a schematic top view of the basic structure of an image separating-type focus detection device as used in this invention.

An image separating-type focus detection device is shown schematically in FIG. 5. The basic structure includes a photographic lens 10, a field mask 11, a condenser lens 12, a pair of re-imaging lenses 13a and 13b, a pair of arrays of photosensitive elements 14a and 14b attached to a single substrate 14, and an aperture mask 15. Light from the subject that passes through different regions on the plane of the exit pupil of photographic lens 10 passes through aperture mask 15 and is formed into an image on the arrays of photosensitive elements 14a and 14b by the pair of re-imaging lenses 13a and 13b. The focus state of photographic lens 10 can be detected from the distance between the two images that are formed.

Figure 6:
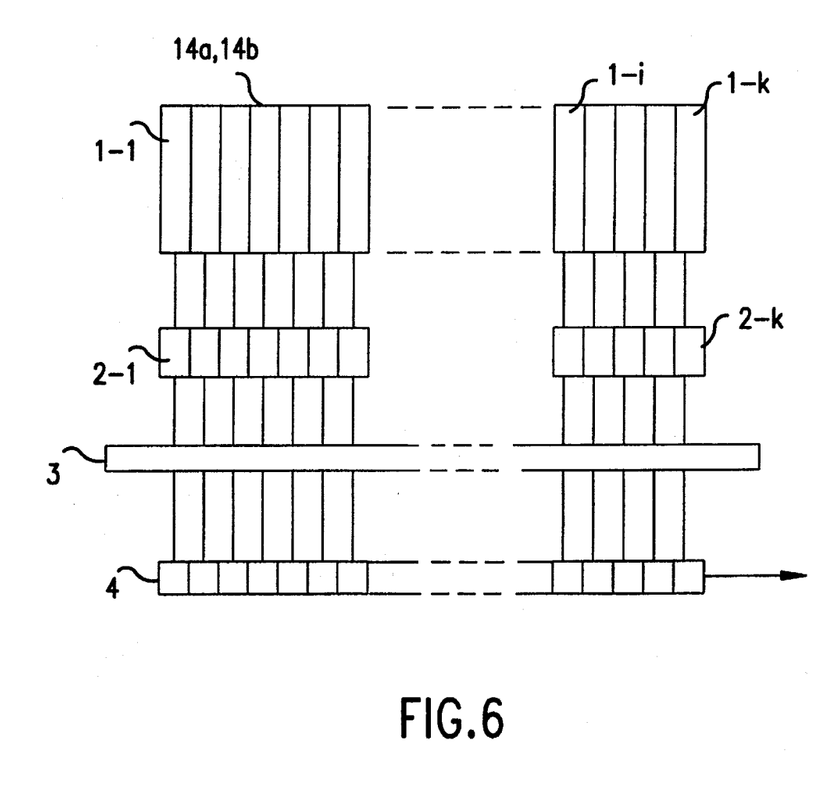
FIG. 6 is a partial schematic drawing showing the structure of a general array of photosensitive elements.

The arrays of photosensitive elements 14a and 14b consist of multiple photosensitive elements 1—1 through 1-k (k referring to a number of units) arranged one dimensionally, as shown in FIG. 6. Electric charge is produced in the photosensitive elements 1—1 through 1-k in accordance with the intensity of the optical image. This electric charge moves within the photosensitive elements 1—1 through 1-k and is accumulated in accumulators 2-1 through 2-k. The accumulated charge is transferred to a transfer component 4 by opening a gate 3 and is used as information for computing the focus state. Hereafter, each of the photosensitive elements 1—1 through 1-k will be generally referred to as photosensitive element 1-i, and each of the accumulators 2-1 through 2-k will be generally referred to as accumulator 2-i.

Figure 7:
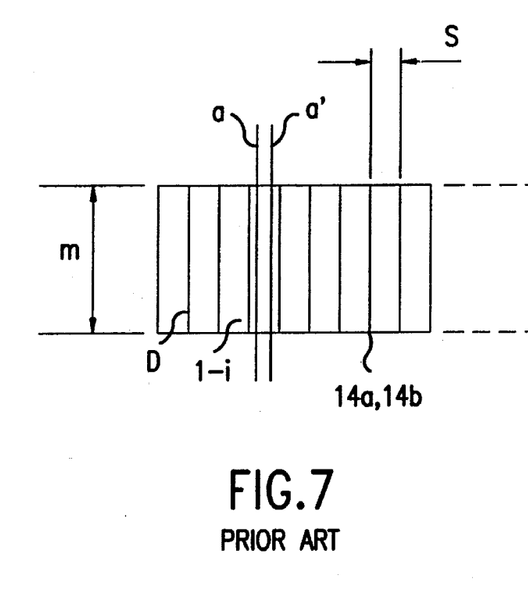
FIG. 7 is a schematic front view of an array used to explain the problems that occur when the direction in which the photosensitive elements are aligned in the array of photosensitive elements matches the direction of horizontal or vertical lines in the image field.

Photosensitive elements 1-i that comprise the arrays of photosensitive elements 14a and 14b shown in FIG. 7 are formed as rectangles. When the direction in which they are aligned corresponds with the direction corresponding to the horizontal direction on the photographic screen (the left-right direction in FIG. 7), the following problems result. Numerous edges in the form of vertical lines that exist in the natural subject field are formed on the arrays of photosensitive light elements 14a and 14b as a narrow optical image "a" parallel to the boundary lines D of the photosensitive elements 1-i. If this optical image "a" is displaced in the horizontal direction in the image field by an amount smaller than the element width S to form the optical image "a'" the output of the light elements 1-i does not change. It is therefore impossible to detect this displacement in position.

In order to solve this problem, in Japanese Laid-Open Application No. 55-29731, the photosensitive elements 1-i are arranged so that the boundary lines D between the photosensitive elements 1-i are inclined by a small angle from the direction orthogonal to the direction in which the photosensitive elements 1-i are aligned. With this example, an optical image "a" corresponding to a vertical line in the image field will fall across more than one of the photosensitive elements 1-i. Accordingly, even if the optical image is displaced by an amount smaller than the element width S to form optical image "a'" the output of photosensitive elements 1-i will change, making it possible to detect this displacement in position. However, if the amount of inclination L of photosensitive elements 1-i is too large, the optical image "a" will fall across many of the photosensitive elements 1-i, causing the precision of focus detection to drop. Conversely, if the amount of inclination is too small, the effects of the inclination will be difficult to determine. Consequently, a range of inclination L of $0.5S \leq L \leq 1.5S$ is considered suitable, taking into consideration that the optical image "a" is generally a certain width.

Another attempt at solving the above problems is shown in U.S. Pat. No. 4,218,623 to Utagawa, in which the photosensitive elements are positioned at an angle.

Figure 8:
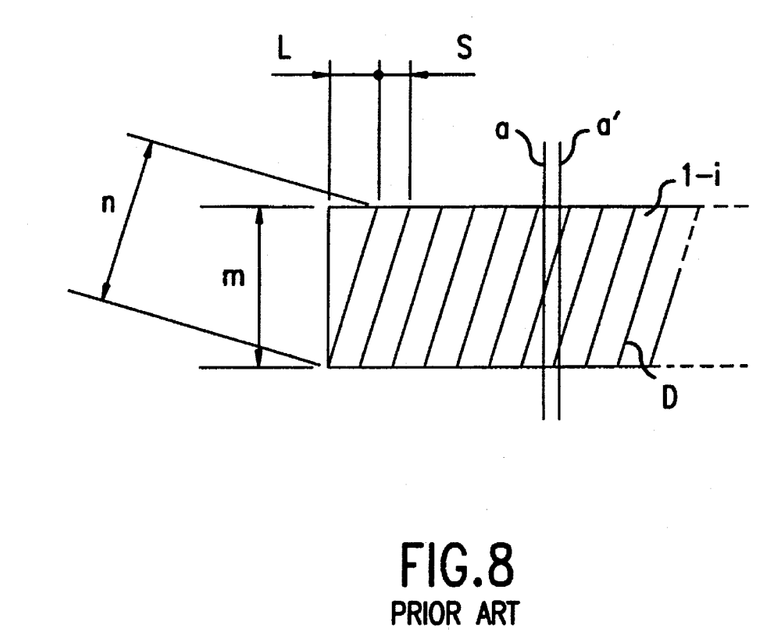
FIG. 8 is an enlarged partial front view of an array of photosensitive elements in a conventional model used to solve the problems shown in FIG. 7.
Figure 9:
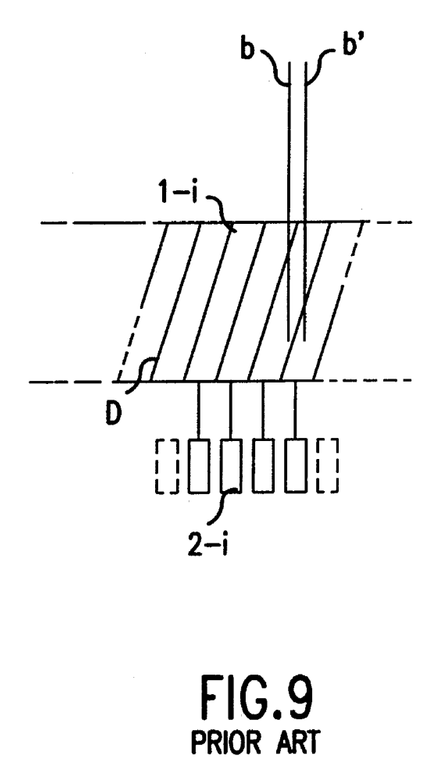
FIG. 9 is a partial drawing of FIG. 8 used to explain problems with such an array of photosensitive elements.

FIG. 8 shows an assembly similar to the Japanese publication and U.S. patent described above. In the example shown in FIG. 8, it is desirable to keep the range of focus detection in the image field the same as in the example in FIG. 7. Thus, when the height of the array in the direction orthogonal to the direction in which the photosensitive elements 1-i are aligned is set at the same value m as in FIG. 7, the length n of photosensitive elements 1-i in the lengthwise direction becomes larger than the height m. Consequently, as seen in FIG. 9, when an optical image "b" corresponding to a vertical line in the image field moves from a position where it barely touches the top edge of a certain one of photosensitive elements 1-i to a position completely outside of this photosensitive element into a neighboring element forming optical image "b'", the time required for movement of charge to accumulator 2i to communicate this change within photosensitive element 1-i takes longer. This is because of the extended length of photosensitive elements 1-i. Until the charge reaches accumulator 2i, the change from optical image "b" to optical image "b'" is not produced as a signal, and the optical image "b" becomes an afterimage that has a negative effect on focus detection. In this manner, the afterimage time becomes longer because of the extended length of photosensitive elements 1-i. This creates a problem in the responsiveness of focus detection to changes in the optical image caused by movement of the subject or adjustment in the photographic lens focus.

SUMMARY OF THE INVENTION

It is an object of the embodiments of this invention to provide a focus detection device that can rapidly detect small displacements with high precision in the optical image on an array of photosensitive elements.

Figure 1:
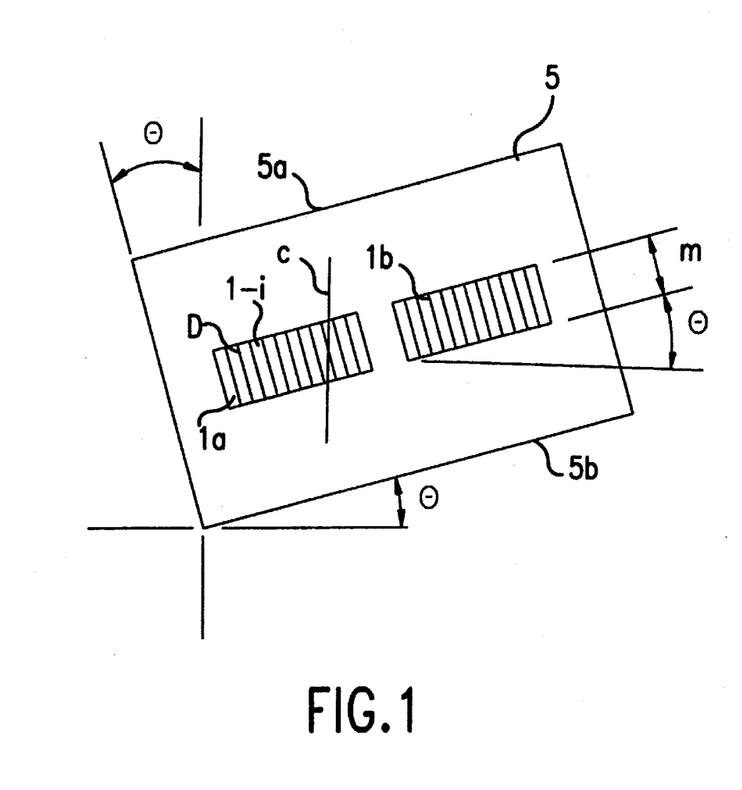
FIG. 1 is a front view of a substrate showing the arrangement of the arrays of photosensitive elements according to a first embodiment of the present invention.
Figure 2:
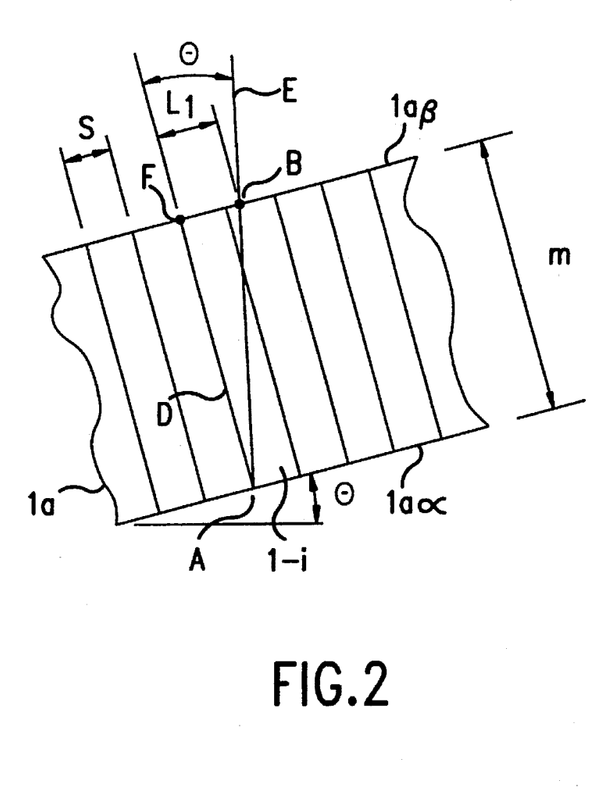
FIG. 2 is an enlarged partial section of FIG. 1 showing an array of photosensitive elements according to the first embodiment of the present invention.

The preferred embodiments shown in FIGS. 1 and 2 are applied to a focus detection device that is equipped with arrays of photosensitive elements 1a and 1b that consist of multiple photosensitive elements 1-i aligned in a single direction. Detection of the focus state of the photographic lens is based on the image of light rays that are received by the arrays of photosensitive elements 1a and 1b after these light rays have passed through different regions on the surface of the exit pupil of the photographic lens.

The arrays of photosensitive elements 1a and 1b are positioned so that the boundary lines D between adjacent photosensitive elements 1-i are orthogonal to the direction in which the photosensitive elements 1-i are aligned. So, these boundary lines D are inclined at a preset angle Θ from the direction corresponding to vertical lines in the image field as seen in FIG. 1. Alternatively, the reference line could be horizontal for vertical frame photography with the arrays aligned in a substantially vertical direction, in which case the boundary lines would be inclined with respect to the horizontal.

The arrays of photosensitive elements 1a and 1b are preferably solidly attached to a substrate 5 along with the parts peripheral to these arrays of photosensitive elements 1a and 1b including the associated accumulators, gate and transfer parts. In this case, substrate 5 is preferably formed in the shape of a rectangle, preferably a square, when viewed facing the surface of photosensitive element 1a. The arrays of photosensitive elements 1a and 1b are positioned so that the direction in which photosensitive elements 1-i are aligned is parallel to sides 5a and 5b of the perimeter of substrate 5. So, sides 5a and 5b of the perimeter of substrate 5 are inclined at a preset angle Θ from the direction corresponding to horizontal lines in the image field as seen in FIG. 1.

Figure 4:
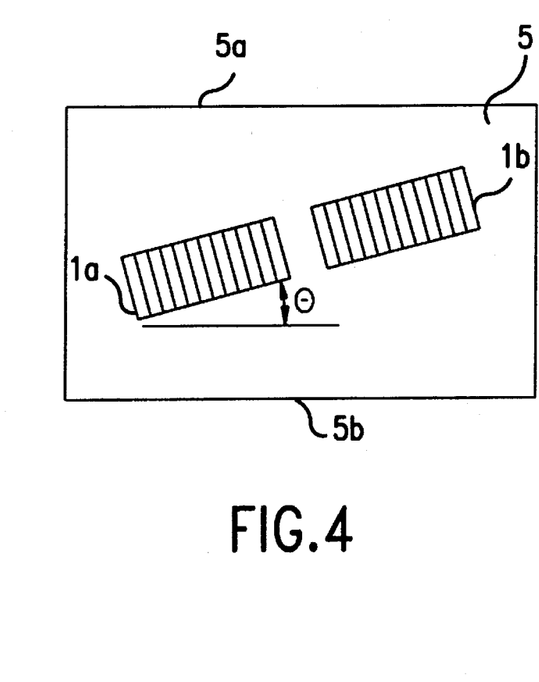
FIG. 4 is a front view of a substrate showing the arrangement of the arrays of photosensitive elements according to a second embodiment of the present invention.

Alternatively, as shown in FIG. 4, the arrays of photosensitive elements 1a and 1b are positioned so that the direction in which photosensitive elements 1-i are aligned is inclined at a preset angle Θ from sides 5a and 5b of the perimeter of substrate 5. So, sides 5a and 5b of the perimeter of substrate 5 are parallel to the direction corresponding to horizontal lines in the image field as seen in FIG. 4.

Because the boundary lines D between adjacent photosensitive elements 1-i are orthogonal to the direction in which the photosensitive elements 1-i are aligned, photosensitive elements 1-i can be made shorter in comparison to cases where the boundary lines D between adjacent photosensitive elements 1-i are inclined with respect to the direction in which the photosensitive elements 1-i are aligned. Because the boundary lines D between photosensitive elements 1-i are inclined by a preset angle Θ from the direction corresponding to horizontal or vertical lines in the image field, small displacements in the optical image "c" which corresponds to horizontal or vertical lines in the image field, can be detected on the arrays of photosensitive elements 1a and 1b.

In the paragraphs herein explaining the methods and functions used in the structure of the present invention to solve the problems stated above, drawings of preferred embodiments are used to facilitate the explanation of the present invention. One of ordinary skill in this art will recognize, however, that the present invention is not limited to these embodiments.

BRIEF DESCRIPTION OF THE DRAWINGS

The invention is described in conjunction with the following drawings in which like reference numerals designate like elements and wherein.

DETAILED DESCRIPTION OF PREFERRED EMBODIMENTS

FIG. 1 shows the arrays of photosensitive elements 1-i and substrate in the preferred embodiment of the present invention. As seen in FIG. 1, the arrays of photosensitive elements 1a and 1b are structured with multiple rectangular photosensitive elements 1-i aligned in a single row so that the boundary lines D between them are orthogonal to the direction in which the photosensitive elements 1-i are aligned.

Using the same optical system as in the example shown in FIG. 5, in these arrays of photosensitive elements 1a and 1b, the optical image is formed by light rays that pass through different regions on the surface of the exit pupil of photographic lens 10. The electric charge generated by photosensitive elements 1-i is accumulated in accumulators 2-i, in the same manner as in the example described above and shown in FIG. 6. Then, the accumulated charge is transferred to transfer components 4 when gate 3 is opened and is used as information for calculating the focus state of the lens.

The arrays of photosensitive elements 1a and 1b and their peripheral parts including accumulators 2-i, gate 3, transfer components 4, and signal processing circuits (not shown) are solidly attached to substrate 5. Around the perimeter of substrate 5 are provided sites (not shown in the drawing) for extracting lead signals, making it possible to produce signals used in the calculation of focus detection. Preferably, substrate 5 is rectangular or square, when viewed from the front facing photosensitive elements 1-i, as seen in FIG. 1. Top side 5a and bottom side 5b of substrate 5 are parallel to the direction in which photosensitive elements 1-i are aligned.

As seen in FIG. 1, the optical image "c" on the arrays of photosensitive elements 1a and 1b corresponds to a vertical line in the image field during horizontal position photography. As is clear from the drawing, substrate 5 is positioned so that top edge 5a and bottom edge 5b are inclined at a preset angle Θ from the direction corresponding to a horizontal line in the image field (the right-left direction in the drawing) so that the optical image "c" falls across several photosensitive elements 1-i.

In this instance, FIG. 2 is used to explain how the value of angle Θ is determined. The point where the boundary line D between the photosensitive elements 1-i intersects bottom edge 1aα of the array of photosensitive elements 1a that extends in the direction in which the photosensitive elements 1-i are aligned is defined as A. The point where a vertical line E drawn from A in the direction corresponding to a vertical line in the image field intersects top edge 1aβ of the array of photosensitive elements 1a is defined as B. Defining the distance L1 from this point of intersection B to the intersection F of the boundary line D and top edge 1aβ, the angle Θ is determined by how long L1 is in relation to the element width S. The length L1 is an amount that indicates the degree of inclination of the array, the same as the inclination amount L in FIG. 8. It is suitable to have this value L1 between 0.5S and 1.5S as noted above, with S being the element width represented by the distance between boundary lines of each photosensitive element 1a.

In other words, defining as "m" the height of photosensitive elements 1-i in the direction orthogonal to the direction in which photosensitive elements 1-i are aligned, the value of m should be:
$0.5S \leq m*\tan \Theta \leq 1.5S$ For instance, if m=80 μ and the element width S=16 μ, then $\Theta$=11.3° when L1=S. Then, it is suitable to have $\Theta$ be between 10° and 15°. Now, because the surface area of a single photosensitive element 1-i cannot be increased very much to maintain the precision of focus detection, there are built-in limits to the element width S and the element height m. It is desirable to determine the height m and the element width S of photosensitive elements 1-i so that the images of photosensitive elements 1-i when projected onto the focal surface of photographic lens 10 have a height no greater than 1 mm and a width no greater than 100 μm. In other words, defining as B the magnification ratio between the photosensitive elements and the focal surface of the photographic lens provides the following relationships:
$S*\beta \leq 100$ μm
$m*\beta \leq 1$mm In addition, even if the length L1 meets these conditions, it is best that $\Theta$ be no greater than 20°.

As is clear from the above explanation, with the first embodiment, because the boundary lines D of photosensitive elements 1-i are orthogonal to the direction in which the elements are aligned, the height m and the length of photosensitive elements 1-i are the same as in the example shown in FIG. 7 so the time needed to produce the charge is reduced from the example shown in FIG. 8, thereby shortening the afterimage time of the optical image "c". In addition, because the boundary lines D of photosensitive elements 1-i are inclined at a preset angle $\Theta$ with respect to the direction corresponding to vertical lines in the image field, even displacements of the optical image "c" smaller than the element width S can be detected with high precision.

Figure 3:
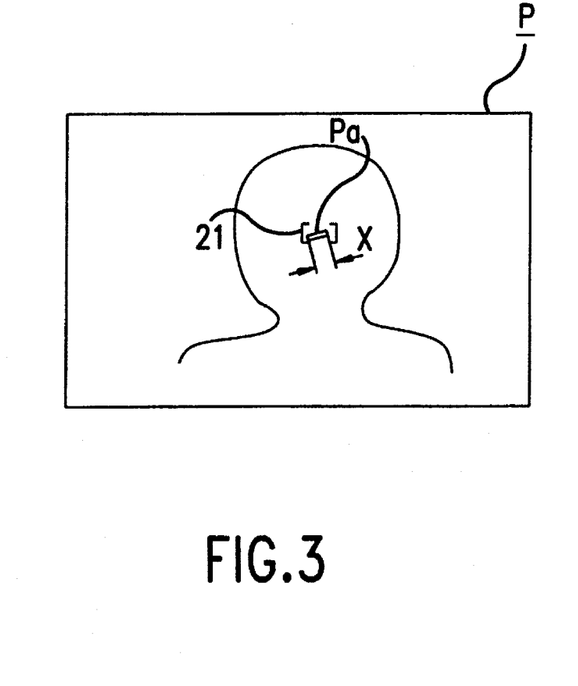
FIG. 3 is a drawing showing one example of a display in the finder field of the focus detection range in a camera equipped with the focus detection device according to the first embodiment of the present invention.

When the entire arrays of photosensitive elements 1a and 1b are inclined at an angle $\Theta$, the focus detection regions themselves in the image field are also inclined by the same angle $\Theta$. However, as seen in FIG. 3, as long as this angle $\Theta$ is not set too large, malfunctions of the camera during operation can be avoided by forming a frame 21 (indicated by [] in the drawing), which indicates the focus detection regions inside the finder field frame P, so that it has a slightly larger width than the projected image Pa of the arrays of photosensitive elements 1a and 1b. For instance, when the arrays of photosensitive elements 1a and 1b are inclined 10°, if the length x of the projected image Pa inside the finder field frame P in the direction in which the elements are aligned is 3 mm, the difference on top and on bottom at the left and right edges of the projected image Pa is about 0.5 mm, and the discrepancy between frame 21 and projected image Pa is within the range where there are absolutely no problems in practical use.

FIG. 4 shows a second embodiment of the present invention. In the first embodiment, the arrays of photosensitive elements 1a and 1b were positioned so that the direction in which photosensitive elements 1-i were aligned was parallel to top side 5a and bottom side 5b of substrate 5, and substrate 5 itself was inclined. In this embodiment, however, the arrays of photosensitive elements 1a and 1b are mounted on substrate 5 so that the arrays of photosensitive elements 1a and 1b are inclined at a preset angle $\Theta$ with respect to top side 5a and bottom side 5b of substrate 5. Thus, it is possible to incline the arrays of photosensitive elements 1a and 1b without inclining square substrate 5, thereby eliminating wasted space around substrate 5 caused by the inclination of substrate 5. Also, when the elements are inclined within the chip in this manner, it is easier to control measurement during manufacturing.

Figure 4A:
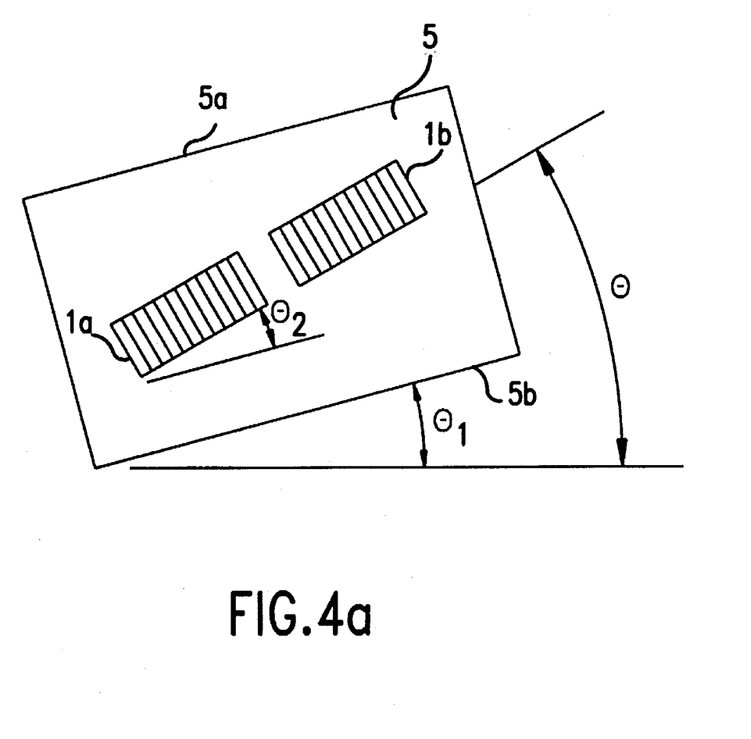
FIG. 4a is a front view of a substrate showing the arrangement of the arrays of photosensitive elements according to a third embodiment of the present invention.

A third embodiment inclines the array assembly at a total angle $\Theta$, which equals $\Theta_1+\Theta_2$, as seen in FIG. 4a. When substrate 5 is inclined at an angle $\Theta_1$, the array of photosensitive elements 1-i may be inclined at an additional angle $\Theta_2$. In this case, the photosensitive element is inclined a total angle $\Theta=\Theta_1+\Theta_2$ from a vertical reference line in the image field. This embodiment essentially combines the first and second embodiments to provide a greater angle of inclination for increased sensitivity while maintaining only a slightly inclined focus detecting region and allowing easier manufacture.

With the embodiments described above, the boundary lines D of the photosensitive elements 1-i are inclined at a preset angle $\Theta$ with respect to the direction corresponding to vertical lines representing an image in the image field. To obtain similar results when photosensitive elements 1-i are aligned in the vertical direction of the image field, it would be appropriate to have the boundary lines D of photosensitive elements 1-i positioned so that they are inclined at a preset angle $\Theta$ with respect to the direction corresponding to horizontal lines in the image field.

As explained above, with the present invention, the photosensitive elements are aligned so that the boundary lines between adjacent photosensitive elements are orthogonal to the direction in which the photosensitive elements are aligned, while the arrays of photosensitive elements are positioned so that the boundary lines between photosensitive elements are inclined at a preset angle from the direction corresponding to vertical or horizontal lines in the image field. Thus, the extension of the length of the photosensitive elements is prevented, and the afterimage time of the optical image is reduced. Detection is also made possible of displacements on the arrays of photosensitive elements of the optical image that corresponds to vertical or horizontal lines in the image field when the displacement is smaller than the element width. Thereby, a focus detection device is realized with excellent responsiveness and superior focus detection precision.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus detection device for detecting a focus state of a lens within an optical field frame having at least one of a horizontal reference line and a vertical reference line, comprising:

a substrate; and at least one array of photosensitive elements linearly arranged on said substrate to detect the focus state of the lens based on an image of light rays received by said at least one array of photosensitive elements after passing through different regions of the lens, each photosensitive element in said at least one array having a boundary line with an adjacent photosensitive element, wherein each boundary line is orthogonal to a direction in which said at least one array is linearly arranged and wherein each boundary line is inclined at a total preset acute angle from said at least one of the horizontal and vertical reference lines.

2. The focus detection device of claim 1 wherein said substrate has at least one edge and said at least one array is arranged parallel to said edge of said substrate and said edge of said substrate is positioned at the preset acute angle from the at least one of said horizontal and vertical reference lines.

3. The focus detection device of claim 1 wherein said substrate has at least one edge with said edge positioned parallel to the at least one of said horizontal and vertical reference lines and said at least one array is positioned at the preset acute angle with respect to the edge of said substrate that is parallel to the at least one of said horizontal and vertical reference lines.

4. The focus detection device of claim 1 wherein said substrate has an edge and said edge is positioned at a first preset angle from the at least one of said horizontal and vertical reference lines and said at least one array is positioned at a second preset angle with respect to said edge of said substrate, wherein the total preset acute angle at which the boundary line is inclined from the at least one of said horizontal and vertical reference lines is the sum of the first and second preset angles.

5. The focus detection device of claim 1 wherein said substrate is square.

6. The focus detection device of claim 1 wherein said total preset acute angle is 20° or less.

7. The focus detection device of claim 1 wherein each photosensitive element has a width S and a magnification ratio $\beta$ with a focal plane of the lens, wherein the width S of each photosensitive element times the magnification ratio $\beta$ is 100 µm or less.

8. The focus detection device of claim 1 wherein each photosensitive element has a height m and a magnification ratio $\beta$ with a focal plane of the lens, wherein the height m of each photosensitive element times the magnification ratio $\beta$ is 1 mm or less.

9. The focus detection device of claim 1 wherein each photosensitive element has width S and a height m and the total preset acute angle ($\Theta$) follows the following relationship:

$0.5S \leq m(\tan\Theta) \leq 1.5S$.

10. The focus detection device of claim 1 wherein each photosensitive element has a width S, a height m, and a magnification ratio $\beta$ with a focal plane of the lens, wherein the total preset acute angle ($\Theta$) is defined by the following relationships:

$\Theta \leq 20°$;

$S\beta \leq 100$ µm;

$m\beta \leq 1$ mm; and $0.5S \leq m(\tan\Theta) \leq 1.5S$.

11. The focus detection device of claim 1 wherein said at least one array comprises two co-linear arrays.

12. An image separating-type focus detection device for detecting a focus state of a photographic lens within an optical field frame having at least one of a horizontal reference line and a vertical reference line, comprising:

photosensitive means for detecting the focus state of the photographic lens based on an image of light rays received by said photosensitive means after passing through different regions of the photography lens, said photosensitive means comprising a linear array of photosensitive elements with boundary lines between adjacent photosensitive elements, wherein each boundary line is orthogonal to a direction in which said array is linearly arranged and wherein each boundary line is inclined at a total preset acute angle from the at least one of the horizontal and vertical reference lines; and substrate means for supporting said photosensitive means.

13. The image separating-type focus detection device of claim 12 wherein said substrate means comprises a rectangular substrate with one side positioned at the preset acute angle from the at least one of said horizontal and vertical reference lines and wherein said array is arranged parallel to another side of said substrate.

14. The image separating-type focus detection device of claim 12 wherein said substrate means comprises a rectangular substrate with one side positioned parallel to the at least one of said horizontal and vertical reference lines.

15. The image separating-type focus detection device of claim 12 wherein said substrate means comprises a rectangular substrate with one side positioned at a first preset angle from the at least one of said horizontal and vertical reference lines, and wherein said array is positioned at a second preset angle with respect to another adjacent side of said substrate, wherein the total preset acute angle at which the boundary line is inclined from the at least one horizontal and vertical reference lines is the sum of the first and second preset angles.

16. The image separating-type focus detection device of claim 12 wherein said substrate means is square.

17. The image separating-type focus detection device of claim 12 wherein said total preset acute angle is 20° or less.

18. The image separating-type focus detection device of claim 12 wherein each photosensitive element has a width S and a magnification ratio $\beta$ with a focal plane of the photographic lens, wherein the width S of each photosensitive element times the magnification ratio $\beta$ is 100 µm or less.

19. The image separating-type focus detection device of claim 12 wherein each photosensitive element has a height m and a magnification ratio $\beta$ with a focal plane of the photographic lens, wherein the height m of each photosensitive element times the magnification ratio $\beta$ is 1 mm or less.

20. The image separating-type focus detection device of claim 12 wherein each photosensitive element has width S and a height m and the total preset acute angle ($\Theta$) follows the following relationship:

$0.5S \leq m(\tan\Theta) \leq 1.5S$.

21. The image separating-type focus detection device of claim 12 wherein each photosensitive element has a width S, a height m, and a magnification ratio $\beta$ with a focal plane of the photographic lens, wherein the total preset acute angle ($\Theta$) is defined by the following relationships:

$\Theta \leq 20°$;

$S\beta \leq 100$ µm;

$m\beta \leq 1$ mm; and $0.5S \leq m(\tan\Theta) \leq 1.5S$.

22. The image separating-type focus detection device of claim 12 wherein said photosensitive means comprises a plurality of co-linear arrays.

23. A method of detecting a focus state of a lens within an optical field frame having at least one of a horizontal reference line and a vertical reference line using an image separating-type focus detection device, comprising the steps of:

provided a substrate having at least two orthogonally arranged sides and an array of photosensitive elements linearly positioned on the substrate, each photosensitive element having a boundary line with an adjacent photosensitive element that is orthogonal to the direction at which the array is arranged and inclined at a preset acute angle with respect to at least one of the horizontal and vertical reference lines;

passing light through the lens;

passing the light from the lens through a pair of re-imaging lenses;

forming the light into a pair of images on the array of photosensitive elements; and detecting the focus state of the lens by determining the distance between the two images that are formed.

24. The method of claim 23 wherein the step of detecting the focus state of the lens comprises producing electric charge in the photoelectric elements based on the intensity of the optical image; and computing the focus state based on the electric charge.

25. The method of claim 24 wherein the step of detecting the focus state of the lens further comprises accumulating the electric charge from the photoelectric elements in accumulators;

transferring the accumulated electric charge from the accumulators to a transfer component to compute the focus state.

26. The method of claim 23 wherein the step of providing the substrate includes inclining the substrate at the preset acute angle with respect to the at least one of said horizontal and vertical reference lines and providing the array of photosensitive elements includes positioning the array parallel to a side of the substrate.

27. The method of claim 23 wherein the step of providing the array of photosensitive elements on the substrate includes inclining the array at the preset acute angle with respect to a side of the substrate.

28. The method of claim 23 wherein the step of providing the substrate includes inclining a side of the substrate at a first angle with respect to the one horizontal or vertical reference line and providing the array of photosensitive elements includes positioning the array at a second angle with respect to one of the sides of the substrate, wherein the preset acute angle is the sum of the first angle and the second angle.

29. The method of claim 23 wherein the step of providing the array of photosensitive elements on the substrate includes arranging the array according to the following relationships:

$\Theta \leq 20°$;

$S\beta \leq 100 \ \mu m$;

$m\beta \leq 1 \ mm$; and $0.5S \leq m(\tan\Theta) \leq 1.5S$, wherein $\Theta$ is the preset acute angle;

$S$ is a width of a photosensitive element;

$m$ is a height of a photosensitive element; and $\beta$ is a magnification ratio between a photosensitive element and a focal plane of the lens.

* * * * *